Jan. 24, 1928.

H. ZEITLIN 1,657,101

BATTERY CUP MACHINE

Filed April 26. 1927

INVENTOR
Herbert Zeitlin
BY
Harry Jacobson
ATTORNEY

Jan. 24, 1928.

H. ZEITLIN 1,657,101

BATTERY CUP MACHINE

Filed April 26. 1927

INVENTOR
Herbert Zeitlin
BY
Harry Jacobsen
ATTORNEY

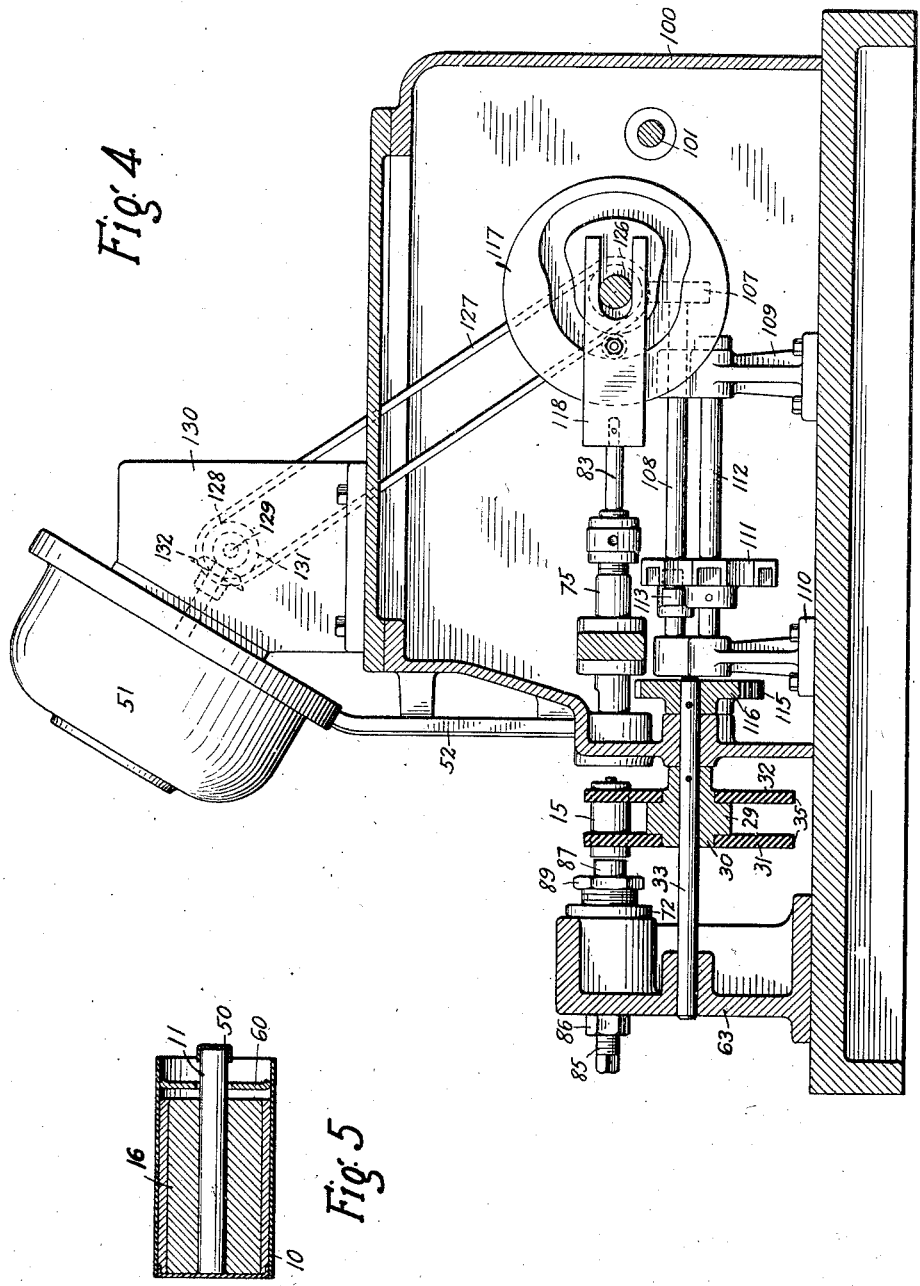

Jan. 24, 1928.	1,657,101

H. ZEITLIN

BATTERY CUP MACHINE

Filed April 26, 1927	4 Sheets-Sheet 4

Herbert Zeitlin INVENTOR
BY Harry Jacobson ATTORNEY

Patented Jan. 24, 1928.

1,657,101

UNITED STATES PATENT OFFICE.

HERBERT ZEITLIN, OF NEW YORK, N. Y., ASSIGNOR TO BRIGHT AUTOMATIC MACHINE CO., INC., OF NEW YORK, N. Y., A CORPORATION OF NEW YORK.

BATTERY-CUP MACHINE.

Application filed April 26, 1927. Serial No. 186,806.

This invention relates to machines for automatically capping the electrode or carbon of a dry battery cell and for automatically inserting a washer into the cup of the cell. In the ordinary form of dry cell, a zinc cup is provided into which is inserted a wrapped cylinder of depolarizing material. Through the center of the depolarizing material is inserted a carbon rod, which projects slightly above the cup, all as is well known. It is customary to cap the carbon electrode with a metallic cap and to press a paper washer about the electrode and into the cup a predetermined distance so that an air space is provided between the washer and the depolarizing material, and a sufficient space is provided above the washer for the sealing wax which is later used to fill said space and to surround the cup in the usual manner.

In carrying out my invention, the partly finished cells, that is, the cells lacking the caps and washers are fed to the machine, as are quantities of the caps and washers. While the carbon of one cell is being capped at one station of the machine, the washer is forced into the cup of another adjacent cell at another station, these operations being performed substantially simultaneously.

The various objects of my invention will be clear from the description which follows and from the drawings, in which, Fig. 1 is a front view of machine showing particularly the cap hopper, the means for feeding the battery cells to be capped and washered and the work support for holding the cells during the operation thereon.

Fig. 4 is a vertical section of the machine taken on the line 4—4 of Fig. 3.

Fig. 5 is a section of the completed battery cell.

Figure 1:
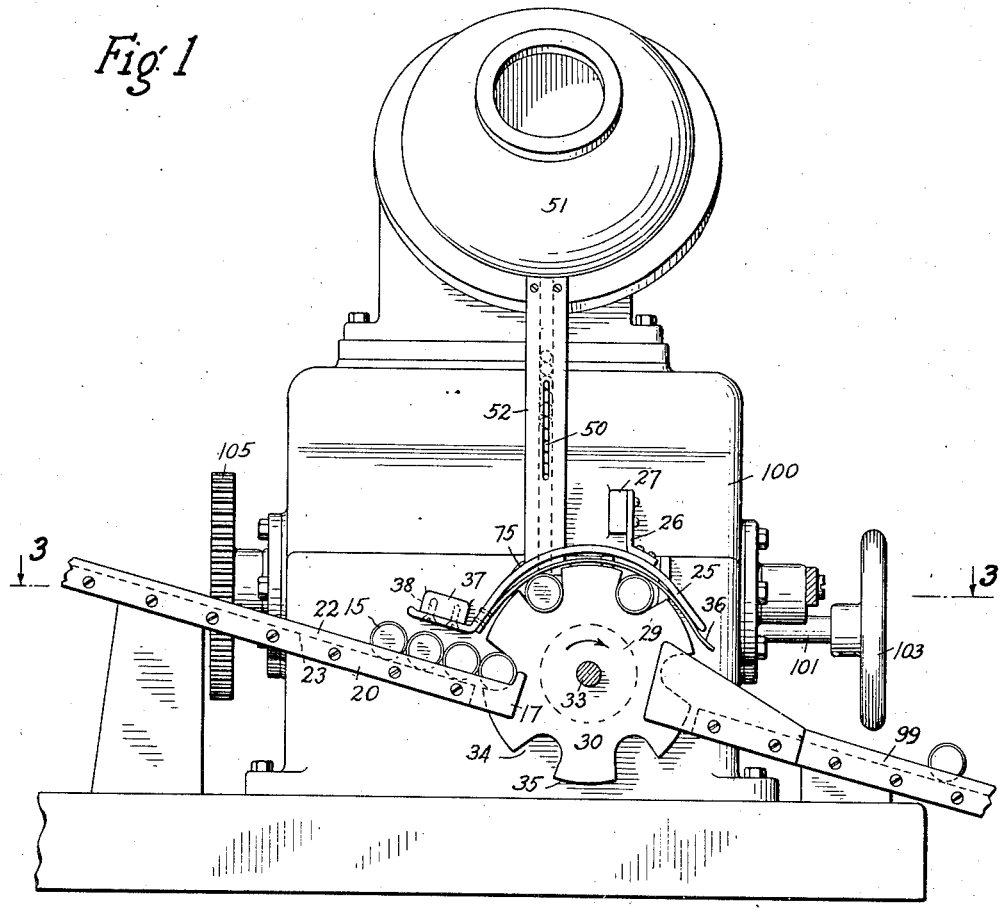
Figure 2:
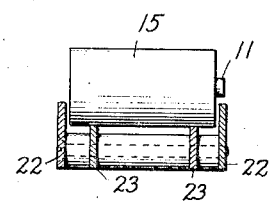
Fig. 2 is a section of the inclined chute along which the work is fed to the machine.

In that embodiment of my invention illustrated, the partially completed battery cells 15, each including the cup 10, and the cylinder 16 of depolarizing material through which the carbon 11 protrudes, are fed to the inclined chute 20, and roll down said chute by gravity toward the lower end 17. The chute includes the parallel sides 22 spaced apart a distance slightly greater than the length of the cell and the rails 23 upon which the cell rolls and which are of less height than the sides 22, so that the movement of the cell is controlled to the point where it reaches the work support 30. The periphery of the support is arranged close to the lower ends of the rails 23 and serves to engage the lowermost one of the row of cells in the chute and to prevent the advance of said row until the lowermost cell is removed. Said support is preferably made of a pair of insulating discs 31 and 32 spaced apart a distance less than the length of the battery cell as by means of the hub 29, and arranged to rotate inside of the chute sides 22. The discs are mounted on the shaft 33, for rotation therewith, suitable notches as 34 preferably rounded at the bottom being provided at intervals in the periphery 35 of said discs so that the lowermost cell of the row on the chute 20 may fall into the notches as each of the notches reaches the end of the chute during the rotation of the support. The cell 15 rests in the bottom of the notch in which it is carried, with the outermost portion of the cell projecting slightly beyond the peripheral edges 35 of said discs. For maintaining the cells against displacement and in contact with the innermost portions of the notches 34, during the movement thereof, and particularly during the rotation into capping position, I prefer to provide a curved spring 36, (Fig. 1) suitably secured at one end to a strap as 25. Said strap is held in place by the lug 37 projecting from the frame of the machine, as by means of the screws 38, and by the angle 26 secured by suitable rivets to the lug 27. The spring 36 is therefore free to engage and press the cell into the notch as said cell is removed from the chute 20.

Figure 9:
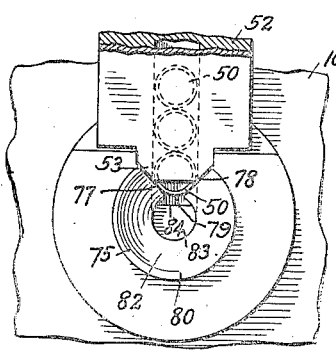

For feeding the metal caps 50 to the capping position, I provide a hopper 51, adapted to receive a supply of caps and a chute 52 (Figs. 1 and 4). The lower end 53 of the chute (Fig. 9) is preferably wedge shaped so that it may enter the V-shaped notch of the capping sleeve, as will be more fully described hereinafter whereby control of the caps is retained by the chute until the capping mechanism receives and forwards the cap. The hopper 51 being of the usual construction, a detailed description thereof is deemed unnecessary. The means for agitating the hopper is also of the usual type and said means together with the means for actuating the agitator will be described more fully hereinafter in connection with the operating or driving mechanism of the machine.

Figure 3:
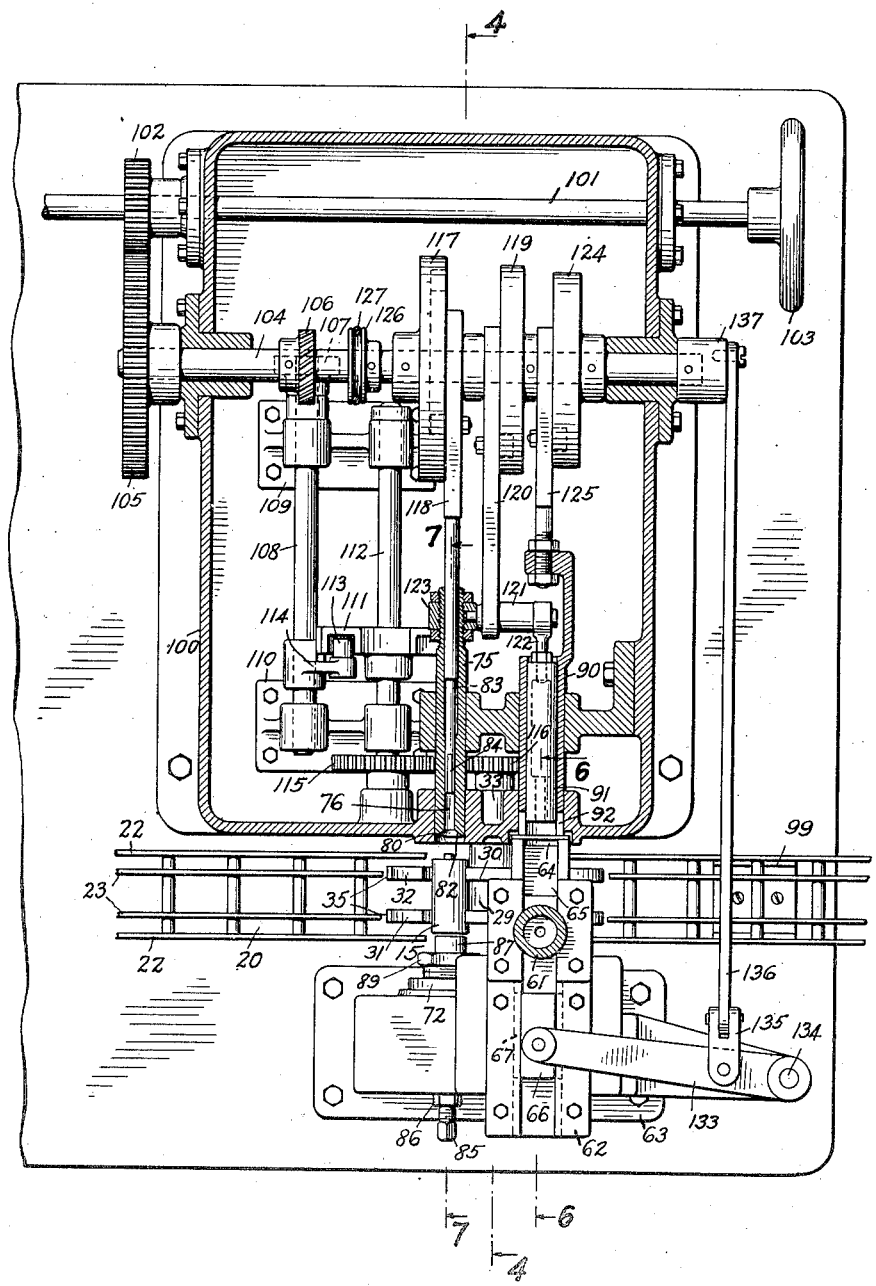
Fig. 3 is a plan view and partial horizontal section of the machine taken on the line 3—3 of Fig. 1.
Figure 6:
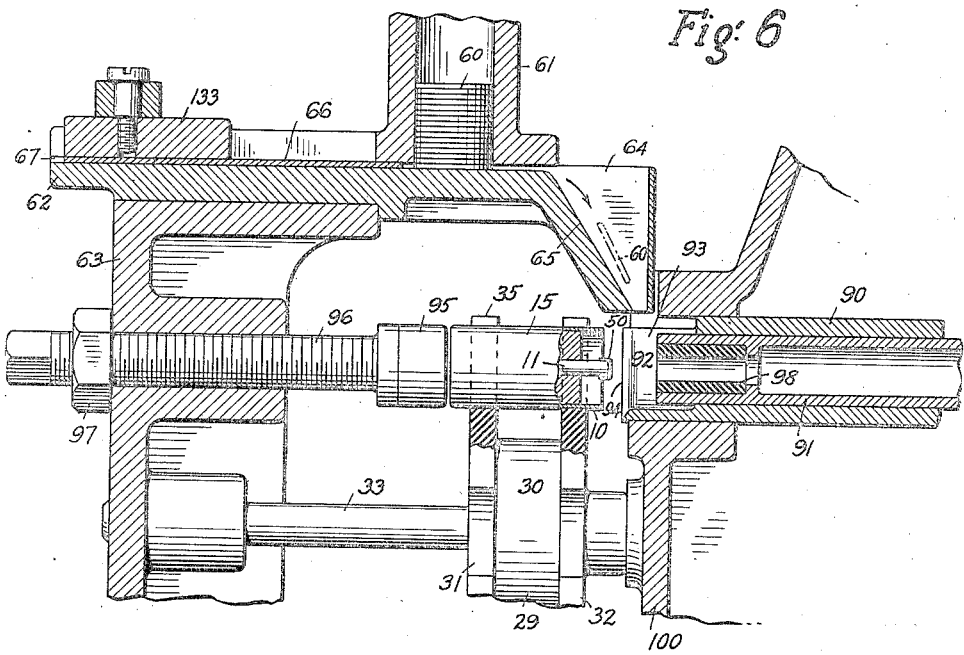
Fig. 6 is a vertical section of the washer applying mechanism taken on the line 6—6 of Fig. 3.

The paper washers 60 to be inserted into the cup 11 are preferably arranged in a stack in a suitable washer tube as 61 (Figs. 3 and 6) having an opening at the lower end thereof and resting on the slide frame 62 which is in turn supported by the auxiliary frame 63 at the front end of the machine. Mounted for reciprocatory movement in a suitable groove 67 of the slide frame, is the slide 66 of the proper thickness to remove a single washer from the bottom of the stack and to advance said washer to the washer chute or opening 64 through which said washer drops in contact with and guided by the inclined face 65 of the washer chute into the washer applying position (Fig. 6). It will be seen therefore that the washer in dropping down the chute 64 is turned at right angles from horizontal to vertical position so that it reaches the washer applying position vertically arranged ready for the insertion thereof in a cell.

The mechanism for capping the carbon rod and for applying the washer will now be described.

The lowermost cell of the row on the chute 20 having entered one of the notches 34 of the work support 30, said support is given a step by step rotation through a predetermined angle, in this case 60°, at each step (Fig. 1) by means soon to be described. The cell 15 is thereby carried by the work support to the capping position as illustrated in Figs. 1, 3, 4 and 7, being held in the notch in which it rests by the action of the spring 36. Just before reaching this position, the lowermost cap 50 of the row in the chute 52 enters the sleeve 75 (Fig. 9) only part way without becoming concentrically arranged therein. While said sleeve is preferably cylindrical in shape, and is provided with the concentric and preferably cylindrical opening 76, it is cut away at the upper part thereof as by means of a suitable V-shaped notch, the walls 77 and 78 of which converge downwardly being preferably inclined at an angle of 45° to the horizontal. The lowermost cap of the row may readily drop from the chute end 53 into said notch until further movement of the cap is prevented when it comes into contact with said walls. The space 79 between the lower ends of said walls is such that the cap does not project below the lowermost edges of said walls 77 and 78, and therefore cannot be caught and crushed by the capping mechanism. At a point spaced rearwardly of the front end 80 of the sleeve 75, said walls are preferably recessed as at 81 a sufficient distance to provide a passage through which the cap 50 may fall into the opening 76 of the sleeve 75 when the passage reaches a point in registration with the cap chute. The front end 80 of the sleeve is preferably conically bored as at 82 for receiving the protruding end of a carbon rod in any position and for aligning said carbon end by causing it to enter the opening 76 as the sleeve 75 is advanced. Slidably mounted in the opening 76 is the capping rod 83, which rod is movable longitudinally relatively to and in the opening 76 of the sleeve 75. Said rod is preferably flattened at the forward end 84 thereof so as normally to provide clearance between the bottom of the lowermost cap in the stack and the rod whereby the cap cannot be caught and mutilated by the rod, said end 84 serving to support the row of caps in the chute when the lowermost cap has dropped partly through the passage 81.

Figure 7:
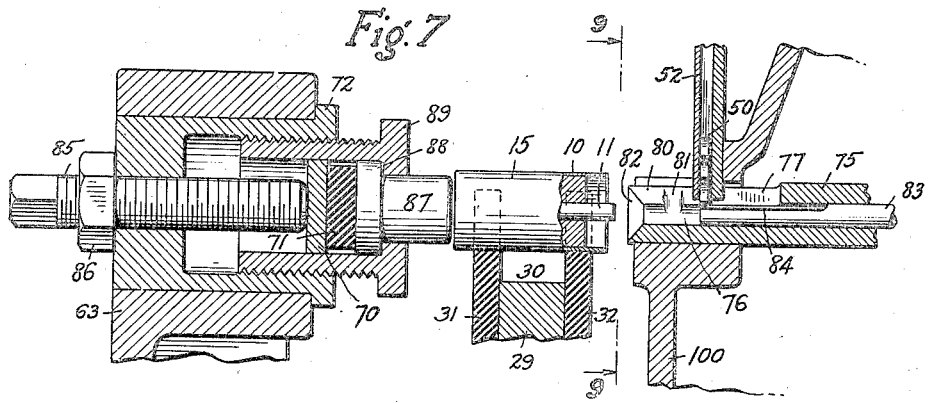
Fig. 7 is a similar view of the cap applying mechanism taken on the line 7—7 of Fig. 3.

As the cell 15 is brought to the capping position, the sleeve 75 is moved forwardly from its rearmost position, the rear end of the carbon rod entering the conical depression 82 of the sleeve and being thereby centered so that the carbon end enters the opening 76. Before the movement of the sleeve and of the rod 83 is begun, the passage 81 of the sleeve is under the lowermost cap of the row, and the forward end of the rod is approximately up to the rear edge of said portion. When said cap therefore drops through said passage 81 into the opening 76, the plunger rod 83, is directly behind the cap and prevents the cap from tilting backwardly out of its proper position for being applied to the carbon. The rod 83 is then moved forwardly with the sleeve 75 and preferably though not necessarily at a greater speed than said sleeve, since it has a greater distance to travel and carries the cap with it, said rod moving to apply the cap after the movement of the sleeve has ceased. The rod 83 remains in contact with the capped carbon while the sleeve 75 is first withdrawn toward its rearmost position wherein the passage 81 is substantially in registration with the row of caps in the chute. The walls 77 and 78 of the notch in the sleeve prevent any of the caps from dropping out of the chute during the rearward movement of the sleeve. After rearward movement of the sleeve is begun, the rod is then withdrawn to its rearmost position ready for the operation to be repeated upon the next cell, the lowermost cap in the chute 52 being prevented from falling through the passage 81 until the rod has been withdrawn past said passage though the cap partly enters said passage and rests on the flattened end of the rod ready to drop further during the later part of the movement of said rod. The cap therefore has only a short distance to drop and control thereof is not lost. For preventing undue movement of the cell in the notch 34 of the work support during the capping operation, and for resisting the pressure on the cell of the rod 83, I provide an adjustable and resilient stop or anvil adapted to engage the bottom of cell, (Fig. 7). Said stop comprises the cylinder 87 preferably made of bakelite or similar material and having a head 88 thereon arranged in the interior of the screw sleeve 89. The cylinder 87 passes loosely through an opening in the headed portion of the sleeve 89 while the head 88 is forced rearwardly by the adjusting screw 85 acting through the intermediary of the washer 70 and the rubber buffer 71. A nut 86 serves to maintain the parts in adjusted position. The screw 85 is threaded in the bushing 72, which is in turn driven into tight engagement into a suitable hole in the frame 63.

This buffer or stop just described acts as an anvil to take the blow given by the capping rod to the battery cell, while it at the same time provides a yielding anvil to compensate for irregularities in the length of the battery cups or carbon electrodes. Adjustment thereof is easily effected, as is the removal of the parts for cleaning, inspection or repair.

Figure 8:
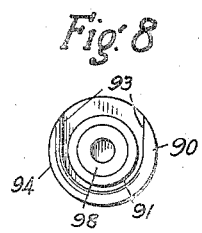
Fig. 8 is a front view of the cup aligning sleeve and the washer applying inner sleeve and Fig. 9 is a vertical section of the end of the cap chute, the carbon aligning sleeve and the capping rod taken on the line 9—9 of Fig. 7.

After the capping operation has been completed, the work support 30 is rotated another step through mechanism soon to be described and the capped cell is brought into the washer applying position. The mechanism for applying the washers 60 consists of the outer sleeve 90 adapted to fit around and to engage and align the cup 10 of the cell, and of a suitable inner sleeve 91 mounted coaxially with and slidable in said outer sleeve. The front portion 92 of the outer sleeve 90 is suitably cut away (Fig. 8) by means of substantially vertical walls 93 so that the washer fed through the opening 64 of the washer slide frame 62 may drop into vertical position in said sleeve end. On the forward movement of the outer sleeve the rounded front edge 94 thereof passes around the rear peripheral edge of the cup 10, thereby properly centering or aligning the cup. The stop 95 adjustably mounted in the frame 63 by means of the screw 96 and the nut 97 serves to prevent undue forward movement of the cell during the washer applying operation. After the cell has been properly aligned as above described, the inner sleeve 91 is moved forwardly, relatively to the outer sleeve 90, thereby engaging the washer which has dropped into the front end 92 and carrying said washer over the capped end of the carbon electrode and forwardly into a cup, a predetermined distance. It will be understood that the washers are suitably perforated to permit the ready passage thereof over the end of the carbon and that the inner sleeve 91 is similarly perforated for the same purpose. I prefer to provide a tube 98 of insulating material in the front end of the inner sleeve 91 (Fig. 6) for insulating the parts and preventing the possibility of the occurrence of a short circuit between the electrodes of the cell.

It will be understood that while a washer is being applied to the capped cell as above described, a cap is simultaneously being applied to the carbon of another cell in the capping position. After the washer applying operation has been completed the work carrier is moved through another step and the capped and washered cell is discharged into the chute 99, which is similar to the cell chute 20.

The driving mechanism for operating the various parts of my improved machine is supported principally by the main frame 100 and the various auxiliary frames secured thereto. A drive shaft 101 is mounted in suitable bearings in the main frame and is adapted to be driven by a pulley thereon not shown, or through the gear 102 thereon by means of any suitable source of power. The usual hand wheel 103 is fixed to the drive shaft so that the machine may be rotated by hand as for the purpose of adjustment in the usual manner. Fixed to the main shaft 104 and meshing with the gear 102 is the gear wheel 105 through which the main shaft is continuously rotated on the rotation of the drive shaft 101.

For giving the work carrier 30 its step-by-step movement, a spiral gear 106 is secured to the main shaft 104 and meshes with a similar gear 107 fixed to the shaft 108 extending longitudinally of the machine and supported in the frames 109 and 110. The Geneva wheel 111 is fixed to the shaft 112, suitably supported in the frames 109 and 110, said Geneva wheel being given its intermittent movement in the usual manner by means of the pin 113 carried by the crank 114 on the continuously rotating shaft 108. At the forward end of the intermittently rotating shaft 112, is the gear wheel 115 meshing with the gear 116. Said gear 116 is suitably mounted on the shaft 33 supported by the frames 100 and the slide frame 63 and carrying the work supports 30.

The capping rod 83 movable in the outer sleeve 75 is operated by the cam 117 on the main shaft 104 through the cam follower 118 connected thereto. The washer applying inner sleeve 91 and the electrode centering sleeve 75 are both preferably operated by the same cam 119 on the main shaft 104 through the cam follower 120, the cross-bar 121 and the respective connections 122 and 123, while the cup centering sleeve 90 is actuated by the cam 124 on the main shaft through the cam follower 125 secured to said sleeve.

I prefer to agitate the hopper by the usual mechanism driven by the pulley 126 on the main shaft 104, which pulley is operatively connected as by means of a suitable belt 127 to the pulley 128. Said pulley 128 is supported by a shaft 129 mounted in the hopper frame 130 and carrying a bevel gear 131 thereon. Said gear 131 meshes with the bevel gear 132 connected to the hopper agitating mechanism. For actuating the washer forwarding slide 66, I provide the lever1 133 pivoted at 134 to an expansion of the slide frames 63 and connected by means of suitable connections as 135 and 136 to the crank 137 on the main shaft 104.

The various operating parts are synchronized so that the capping and washer applying operations are performed in proper time and the work is forwarded by the carrier to the station whereat the work is to be done without interference of the parts.

The operation of my improved machine is as follows:

A quantity of metal caps having been inserted in the hopper 51 and a stack of perforated washers arranged in the washer tube 61, the cells to be capped and washered are supplied to the chute 20 and roll down said chute to the lowermost end thereof, the last cell in the row being normally engaged by the periphery 35 of the work carrier 30 but being ready to be picked up by said carrier. In the position shown in Fig. 1, a cell 15 has entered one of the notches 34 of the work-carrier and is ready to be lifted on the rotation of the carrier in the direction of the arrow. As said carrier is rotated, the cell in the notch is first maintained therein by the action of the remaining cells of the row in the chute, and afterwards by the engagement thereof by the spring 36. Said spring is adapted to yield, as the rotation continues against the strap or guard 25. The machine being started, the work-carrier 30 is rotated through one step, equivalent to the angle between adjacent notches 34, said rotation being transmitted to the carrier through the main shaft 104, the spiral gears 106 and 107, the shaft 108 and the pin 113 Said pin acts to rotate the Geneva wheel 111 through one step on each revolution of the shaft 108. The intermittent movement of said wheel 111 is transmitted through the shaft 112, the gears 115 and 116 and the shaft 33 to the work-carrier. When the cell reaches capping position (Fig. 7) the carbon aligning sleeve 75 is brought forwardly from its retracted position wherein a cap from the chute has just fallen through the passage 81 into the opening 76. In this position, the capping rod 83 is arranged just rearwardly of the cap deposited in the sleeve 75, whereby the cap is prevented from tilting and is maintained in its upright position so that it may readily be carried forward. The conical end 82 of the sleeve when brought to its most forwardly position engages the end of the carbon and centers or aligr the carbon in the proper position in the opening 76 to receive the cap. On the further rotation of the main shaft 104 and the cams mounted thereon, the cam 117 serves to advance the capping rod 83 which rod carries with it the cap deposited in the opening of the sleeve and serves to force said cap over the end of the carbon. The blow of the capping rod is taken up by the rubber buffer 71, which also prevents injury to the work due to irregularities in the lengths of the carbon rods or of the work. The capping operation having been completed as just described, the cam 117 serves to maintain the rod 83 in contact with the capped end of the carbon while the cam 119 retracts the sleeve 75. After the retraction of said sleeve is begun, the cam 117 withdraws the rod 83 so that said sleeve and said rod move backwardly together, though the rod may move somewhat faster than the sleeve. As the passage 81 of the sleeve 75 is drawn back to a point in registration with the chute, the lowermost cap which has been supported by the walls 77 and 78, drops through the passage 81 upon the flattened end 84 of the rod. Said rod being then brought back by the cam 117 to its rearmost position, the cap is allowed to drop completely through the passage 81 into the opening 76 ready for the capping operation to be repeated.

While said sleeve and rod are being retracted, the Geneva pin 113 operates the Geneva wheel 117 to advance the work support 30 to its next position wherein the cell is arranged in readiness for the washer to be inserted thereinto. During the rotation of the work support to the washer applying position, the crank 137 on the main shaft 104, through the various connections previously described, (Fig. 3), serves to operate the lever 133 and slide 66 to remove the lowermost washer from the stack and to drop said washer through the opening 64 into position (Fig. 6) in the end 93 of the aligning sleeve 90, which is then substantially in its rearmost position. Being advanced by the cam 124, said end 90 engages the outer surface of the cell cup 10 and aligns said cup so that the washer may be centrally inserted thereinto, the stop 95 serving to prevent undue forward movement of the work during the washer inserting operation. The washer applying inner sleeve 91 is then advanced relatively to the sleeve 90 by the cam 119 and forwards said washer within the sleeve 90 until the end of the carbon rod is reached, whereafter further advance of the inner sleeve 91 forces the washer over the end of the carbon and into the cell the predetermined distance. Further rotation of the main shaft 104 serves to withdraw the outer sleeve 90 and the inner sleeve 91 into their retracted positions as shown in Fig. 6, and serves further to rotate the work support another step whereby the capped and washered cell is dropped out of the notch 34 in which it rests, and down upon the chute 99 into a suitable receptacle, not shown, provided therefor.

It will be seen that I have provided a simple and compact machine for carrying out the functions for which it is intended efficiently, rapidly and economically. I do not intend to be understood however, as limiting myself to the specific form of my invention shown and described, since various changes may be made without departing from the spirit and scope of the invention and the range of equivalents afforded by the appended claims.

I claim:

1. In a machine of the character described, intermittently rotatable means for advancing a cell, means operative during the rest period of said rotatable means for capping the cell, and means operative during the same period for applying a washer to a second cell.

2. In a machine of the character described, a support for a plurality of cells, means for capping one of the cells while carried by said support, means operative during the capping operation for inserting washer into another of the cells carried by said support, and means for intermittently operating said support.

3. In a machine of the character described, an intermittently rotatable support provided with spaced notches therein for a plurality of cells, means operative substantially simultaneously on adjacent cells on said support for capping one of said cells and for inserting a washer into the adjacent cell.

4. In a machine of the character described, cap positioning means, washer positioning means, means for advancing a pair of cells respectively into cap applying and washer inserting positions, means for capping one of said cells, and means arranged in juxtaposition to said capping means for inserting a washer in the other of said cells.

5. In a machine of the character described, a frame, cap applying means slidably mounted in said frame for applying a cap to one cell, and washer inserting means slidably mounted in said frame adjacent to said cap applying means for inserting a washer into another cell.

6. In a machine of the character described, means for delivering caps to the capping position, means for feeding washers to the washer applying position, an intermittently rotatable work-support having notches therein adapted to receive and advance a plurality of cells successively into the capping and washer applying positions, means for capping a cell in the capping position and means for inserting a washer into said cell in the washer applying position, said capping and washer inserting means being operative when said work-support is at rest.

7. In a machine of the character described, a cap chute for delivering a cap into capping position, washer tube, a reciprocatory slide for advancing the lowermost washer of a stack in said tube toward the washer inserting position, a chute for guiding the washer into washer applying position, a hollow reciprocatory sleeve having an angular notch in the upper part thereof for receiving a cap from said cap chute, and having a narrow passage depressed from the sides of said notch for allowing a cap to pass into the interior of said sleeve, a rod slidably mounted in said sleeve, means for operating said sleeve for aligning a cell in the capping position, means for reciprocating said rod for capping said cell, a second outer sleeve having an enlarged opening in the forward end thereof for receiving a washer and for aligning a cell in the washer applying position, and an inner sleeve slidable in said outer sleeve for advancing a washer and inserting said washer into a cell.

8. In a machine of the character described, means for capping a cell comprising a reciprocatory sleeve having a conical depression in the end thereof adapted to receive and align the carbon rod of a cell, inclined walls forming an angular notch at the upper part of said sleeve for normally preventing a cap resting on said walls from entering the interior of said sleeve, each of said walls having a passage therein for permitting a cap to enter the interior of said sleeve when the cap is in registration with the passage thereof, and means slidable in said sleeve for advancing the cap into capping position.

9. In a machine of the character described, means for aligning and capping a cell comprising a sleeve having an enlarged opening at one end for the reception of the carbon rod of a cell, and having an opening at the top thereof, adapted to receive a cap while preventing the cap from passing through said opening, there being an enlarged passage in the walls of said top opening adapted to allow the passage of a cap therethrough, and a rod slidable in said sleeve for preventing the overturning of said cap and for advancing said cap relatively to said sleeve.

10. In a machine of the character described, means for inserting a washer into a cell comprising a hollow outer sleeve having an enlarged opening at one end thereof for receiving a washer in vertical position and for aligning a cell by the engagement of the peripheral portion of said opening with the outer surface of said cell and an inner sleeve slidable in said outer sleeve for advancing said washer relatively to said outer sleeve while said outer sleeve is in engagement with said cell.

11. In a machine of the character described, a washer tube adapted to support a stack of washers, a slide frame having a washer chute therein arranged rearwardly of said washer tube and a reciprocatory slide for removing the lowermost washer of the stack and for advancing said washer to said chute, whereby said washer drops into vertical position, means for aligning a cell and for receiving said washer, and means for applying the washer to the cell after it has been aligned.

12. In a machine of the character described, a pair of notched discs spaced apart and adapted to receive and support cells in the notches thereof, means for intermittently rotating said discs for advancing each of a pair of cells respectively into capping and washer inserting positions, a sleeve having an angular notch in the top thereof for aligning the carbon rod of a cell in the capping position, a cap chute entering the angular notch of said sleeve and adapted to supply caps to said sleeve, said sleeve having an enlarged passage in the notch thereof for allowing a cap to drop therethrough into the interior of said sleeve and a rod having a flattened upper surface slidable in said sleeve for advancing a cap into capping position.

13. In a machine of the character described, a cap hopper, a cap receiving sleeve having an angular notch therein, a cap chute having one end thereof inserted into the notch of said sleeve, and the other end thereof adapted to receive caps from said hopper, a washer tube for holding a stack of washers therein, a reciprocatory slide for removing one washer at a time from the stack and for forwarding said washer into washer applying position, an outer washer sleeve having an enlarged opening in one end thereof for receiving a washer, a member slidable in each of said sleeves, a notched work-support adapted to receive a plurality of cells, means for intermittently rotating said support for bringing adjacent cells respectively into substantial alignment with said cap and washer sleeves respectively, and means for reciprocating said members while said support is at rest for capping a cell and for inserting a washer into the adjacent cell.

14. In a machine of the character described, means for feeding a cap into capping position and for controlling said cap during the feeding thereof comprising a hollow reciprocatory capping sleeve having an angular notch in the upper part thereof, said notch being provided with passage of sufficient length to allow a cap to drop therethrough into the interior of said sleeve, a cap chute, a wedge-shaped end on said cap chute entering the notch of said sleeve and a rod mounted for reciprocatory movement in and relatively to said sleeve.

15. In a machine of the character described, means for feeding a washer into washer applying position comprising a vertical tube adapted to hold a vertical stack of washers therein, a reciprocatory slide for removing the lowermost washer of the stack and advancing said washer, a washer chute having an inclined forward wall for receiving the washer advanced by said slide and turning said washer into substantially vertical position during the passage thereof through said chute, a hollow cell aligning outer sleeve open at the top thereof for receiving said washer, a hollow washer applying inner sleeve slidably mounted in said sleeve, and adjustable stops arranged coaxially with and forwardly of said sleeves, respectively.

16. In a machine of the character described, means for feeding a cap into cap applying position including a chute and an open top sleeve into which the end of said chute enters, whereby the movement of the cap is controlled during its entry into said sleeve, there being a passage in said sleeve for permitting a cap to drop therethrough, a movable rod arranged immediately behind the rear edge of said passage at the time when a cap drops through said passage, means for reciprocating said rod, a work-carrier, means for advancing said carrier from the capping to the washer applying position, and washer applying means.

17. In a machine of the character described, cap feeding means, cap applying means adapted to receive a cap from feeding means and to control the movement of said cap during feeding thereof, a work-support adapted to receive cells to be capped and to advance said cells into cap applying position, means for intermittently rotating said support from cap applying to washer applying position, an inclined washer chute, a washer slide for advancing a washer into said chute whereby said washer is turned at right angles, and open top outer sleeve for receiving said washer and for aligning a cell in the washer applying position and an inner sleeve slidable in said outer sleeve for applying the washer.

18. In a machine of the character described, a cap chute, there being a wedge-shaped end on said chute, a hollow carbon aligning sleeve, having a wedge-shaped notch at the upper part thereof into which said chute end is inserted, the walls of said notch being of such inclination and so spaced that the lowermost cap in said chute is normally supported by the walls of said notch above the interior of said sleeve, a passage depressed from the walls of said notch for allowing a cap to drop therethrough when said passage is arranged in registration with said chute on the movement of said sleeve, a rod slidable in said sleeve, there being a flattened end on said rod adapted to support a cap which has dropped part way through said passage until said rod is drawn rearwardly of said passage during the movement of said rod in said sleeve.

19. In a machine of the character described, a cell chute, rotatable means adjacent said chute for receiving a cell from said chute and advancing said cell to capping and washer applying positions, and a curved spring adapted to engage a pair of cells in said means for preventing displacement of said cells.

20. In a machine of the character described, reciprocatory means for capping a cell, and an adjustable combined buffer and anvil adapted to engage the bottom of a cell during the capping operation including an anvil, an adjusting screw and a rubber member interposed between said screw and said anvil.

HERBERT ZEITLIN.